United States Patent [19]

Kobayashi

[11] 4,160,255

[45] Jul. 3, 1979

[54] RECORDING APPARATUS WITH INTERMITTENT POWER USAGE

[75] Inventor: Keigo Kobayashi, Ibaraki, Japan

[73] Assignee: Mitogiken, Ltd., Japan

[21] Appl. No.: 834,497

[22] Filed: Sep. 19, 1977

[30] Foreign Application Priority Data

| Oct. 4, 1976 [JP] | Japan | 51-119699 |
| Oct. 4, 1976 [JP] | Japan | 51-134160[U] |
| Oct. 13, 1976 [JP] | Japan | 51-138298[U] |

[51] Int. Cl.² .......................................... G01D 15/04
[52] U.S. Cl. ....................................................... 346/79
[58] Field of Search ..................................... 346/79, 93

[56] References Cited

U.S. PATENT DOCUMENTS

| 2,280,613 | 4/1942 | Arey | 346/93 |
| 3,048,848 | 8/1962 | May | 346/79 X |
| 3,562,762 | 2/1971 | Kugler | 346/79 X |
| 3,921,178 | 11/1975 | Weisgerber | 346/79 X |
| 4,032,926 | 6/1977 | Hale | 346/79 |

*Primary Examiner*—George H. Miller, Jr.
*Attorney, Agent, or Firm*—Thomas E. Beall, Jr.

[57] ABSTRACT

Battery-operated, dot type recording apparatus which is so constructed that the recording paper feed and the recording operation are alternately executed in short times and that a measuring instrument is actuated only during a period of time covering time intervals before and after each recording operation, the actuation of the measuring instrument and the recording paper feed as well as the recording operation being carried out at good timing in a short period of time, whereby the consumption of the battery is low, no high power is required at a time, and the recovery time of the battery suffices, so that the battery is of long life.

14 Claims, 6 Drawing Figures

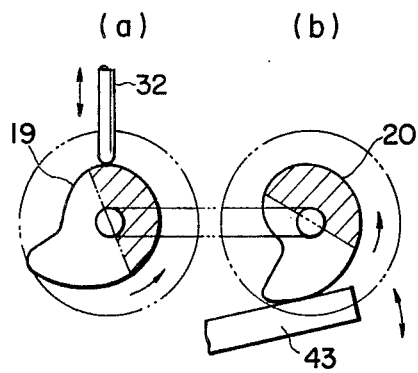
FIG. 2
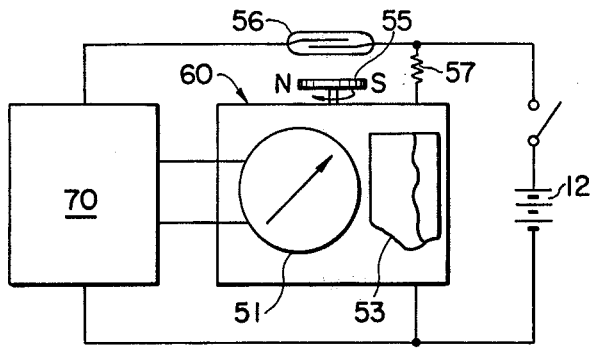
FIG. 3
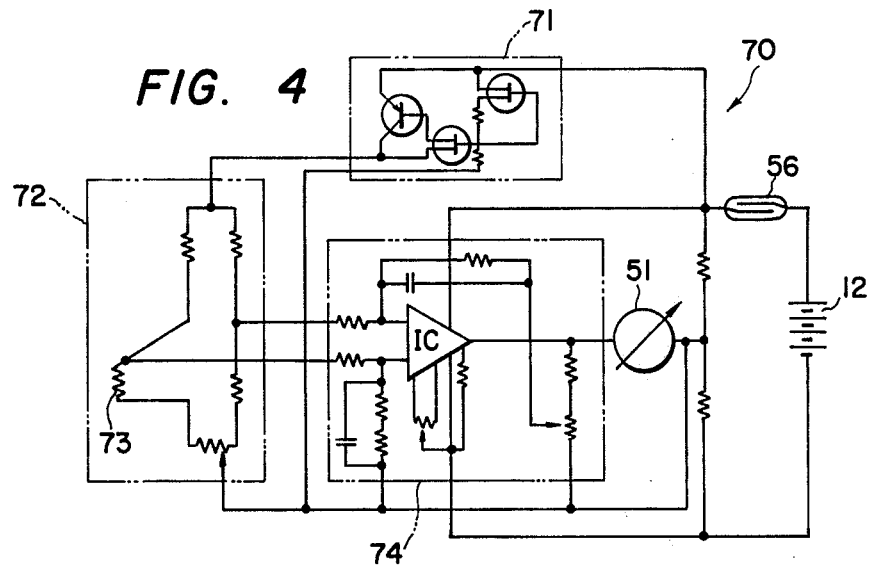
FIG. 4
FIG. 5
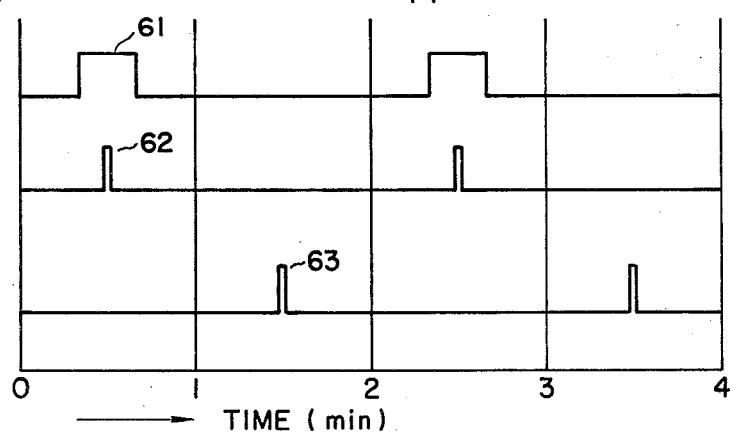
FIG. 6

RECORDING APPARATUS WITH INTERMITTENT POWER USAGE

BACKGROUND OF THE INVENTION

1. Field of the Invention

This invention relates to recording apparatuses, and more particularly to small-sized recording apparatus which operates for a long term by using dry cells or the like as a power source.

2. Description of the Prior Art

Usually, prior-art recording apparatuses are operated by connecting them to commercial power supply lines. With the apparatuses, therefore, it is impossible to automatically record the temperature etc. for long in a region which is far from human habitation and in which such power supply is unavailable, for example, a mountainous district or the sea bottom. Although the recording becomes possible by employing a solar battery as the power source, the equipment requires great expense. In case of employing dry cells as the power source, the power of all of a measuring instrument, the recording apparatus, etc. depends thereon, so that the battery is intensely dissipated and that it cannot possibly endure use over a long period of time.

In order to solve these problems, the inventor has disclosed in Japanese Patent No. 763268 (Japanese Patent Application Publication No. 23914/1974) miniaturized recording apparatus of the dot type which can record, for example, the temperature, voltage, current etc. over a long term, for example, continuously for more than one year by employing a single U-1 dry cell as its power source and using a roll of recording paper. This apparatus adopts a small-sized clock which is constructed of a coiled spring adapted to be intermittently driven by the single U-1 dry battery. The load of clock gears consists only of a wheel for feeding the recording paper. A driving force for a cam employed in a dotting device is taken directly from a driving gear. Moreover, the turning effort of the cam assists in the drive of the feed wheel for the recording paper.

With such mechanism, it has been possible to carry out the recording paper feed and recording operation of the recorder in short times and to achieve a saving of the power consumption as well as the recovery of the battery. The proposed expedient, however, has not taken the actuation of a measuring instrument into consideration and has not been fully satisfactory in points of the recording precision and the handling of the recording paper.

SUMMARY OF THE INVENTION

This invention has been made in order to solve the above-mentioned problems, and has for its principal object to provide small-sized recording apparatus which is of low required power and which can operate for a long term with e.g., a dry battery, particularly small-sized recording apparatus which need not be replenished with its power source for long.

Another object of this invention is to provide small-sized recording apparatus in which the feed of recording paper is accurate.

Still another object is to facilitate the inspection and reception of recording paper and to enhance the handling efficiency thereof.

The recording apparatus of this invention for accomplishing these objects is chiefly characterized in that the actuation of a measuring instrument and the recording paper feed and recording operation of a recorder are executed in the shortest possible times, while these three operations are carried out at good timing, and that both the dot printing and the recording paper feed are executed by a micromotor, no power therefor being taken out from a clock mechanism.

Thus, the recording apparatus of this invention has the three operations of the actuation of the measuring instrument, the recording paper feed of the recorder and the recording operation thereof performed in a short period of time and at good timing, so that the dissipation of a battery used is low, that any considerable power is required at a time and that the recovery time of the battery is sufficient, which assure a long life of the battery.

The dot printing and the recording paper feed are fully performed by the micromotor in case of employing the clock mechanism, and any power for these operations is not obtained from the clock mechanism. Accordingly, the mechanism mechhanism continues to operate accurately, and the recording paper feed is accurate even in case of a recording over a long term.

When the recording paper employed is one of folding type, it is easily inspected and received, and the handling efficiency of the recording apparatus is enhanced.

When, as the meter pointer of the recording apparatus, one whose tip is made of a synthetic resin wire is employed, clear dots can be acquired.

In general, the dot type recording apparatus records by rapping pressure-sensitive recording paper with the meter pointer, or by rapping a ribbon impregnated with ink with the meter pointer. The meter pointer is such that a duralumin wire is inserted and fixed at the tip of a duralumin fine pipe. At the recording, the portion of the duralumin wire is caused to rap. As the duralumin raps a large number of times, it becomes flat gradually, and the area of a rapping part thereof increases. Therefore, dots on the recording paper become larger and thinner gradually, and it becomes impossible to read precise measured values. As a mesure for improvement, there has already been adopted a method wherein cloth serving as a cushion is placed under the pressure-sensitive recording paper thereby to moderate shocks. The dots thus printed, however, are not clear due to the appearance of the texture of the cloth and cannot provide a satisfactory recording. In contrast, according to this invention, the use of synthetic resin wire prevents the dot size from changing even in case of a long-term operation and enables one to obtain an accurate recording.

BRIEF DESCRIPTION OF THE DRAWINGS

The present invention will be understood by reference to the following detailed description and to the accompanying drawings, wherein:

FIGS. 2(a) and 2(b) are views for explaining the operations of cams in the recording apparatus of FIG. 1, FIG. 3 is a block diagram of a temperature measuring system which employs a variation of the recording apparatus of this invention, FIG. 4 is a circuit diagram of a temperature measuring instrument in FIG. 3, FIG. 5 is a time chart showing the mutual relations between the recording apparatus and the temperature measuring instrument, and FIG. 6 is a sectional view of a meter pointer in the embodiment of the recording apparatus of this invention.

Figure 1:
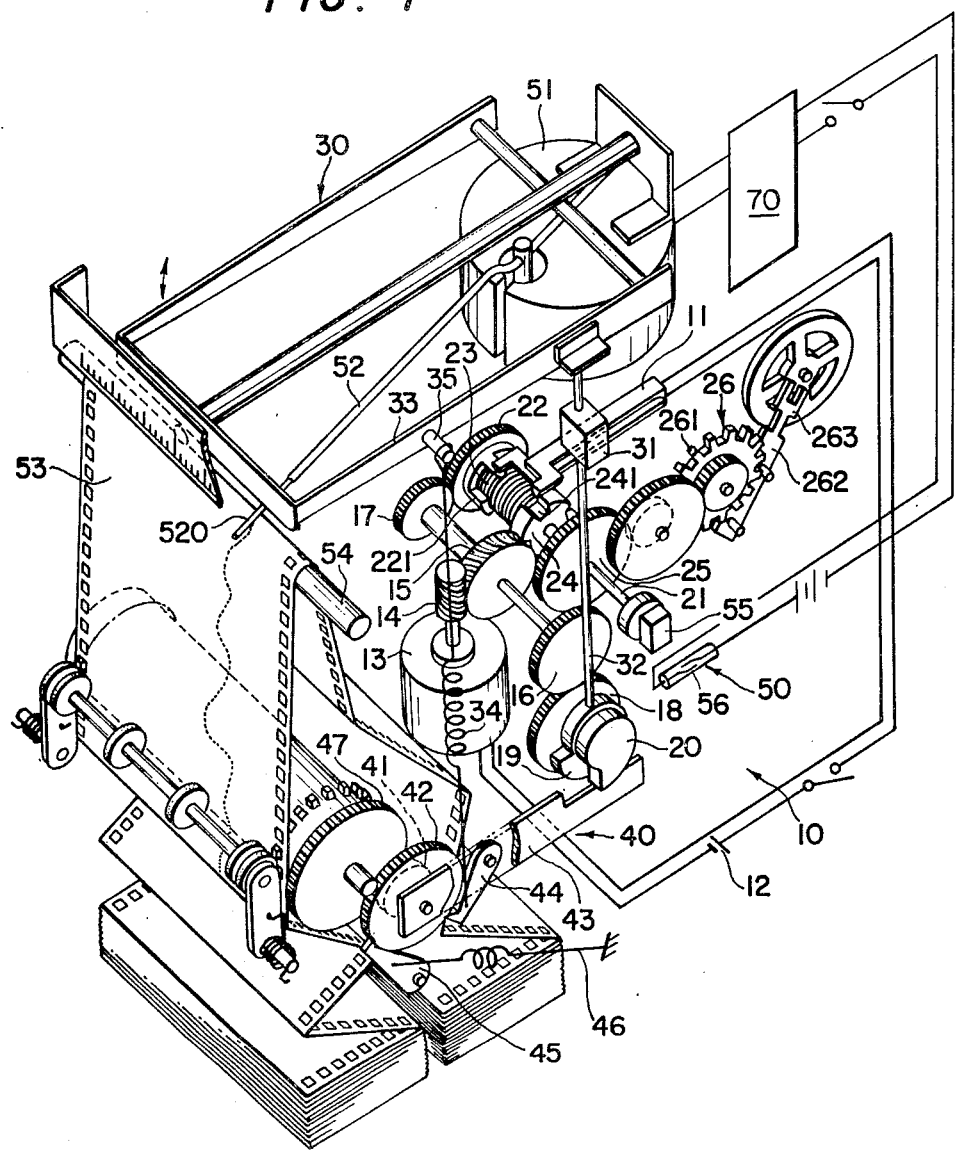
FIG. 1 is a perspective view of an embodiment of the recording apparatus of this invention.

DESCRIPTION OF THE PREFERRED EMBODIMENTS:

FIG. 1 shows dot type small-sized recording apparatus employing pressure-sensitive recording paper of folding type as an embodiment of this invention. This recording apparatus includes as its main constituents a driving portion 10, a dotting mechanism 30, a recording paper feed mechanism 40, a meter 51 and the power switching portion 50 for the measuring instrument.

The driving portion 10 has a micromotor 13 and a clock mechanism 26. The micromotor 13 is connected to a power source 12 through a switch 11. Upon closure of the switch 11, the micromotor 13 rotates to turn a worm 14 mounted on a rotary shaft of the micromotor 13 and to rotate gears 16 and 17 mounted on the same shaft as that of a worm wheel 15. The gear 16 revolves a gear 18 meshing therewith, and revolves cams 19 and 20 mounted on the same shaft as that of the gear 18. Owing to the revolutions of the cams 19 and 20, the dotting mechanism 30 and the recording paper feed mechanism 40 are operated. On the other hand, the gear 17 turns a gear 22 which is rotatably mounted on a shaft 21. A plurality of protrusions 221 made of nylon are provided on one side of the gear 22, and one end of the switch 11 lies in contact therewith. The gear 22 is rotatably attached to the shaft 21, and fixes one end of a coiled spring 23. The other end of the coiled spring 23 is retained by a contact ring 24 of nylon with which one end of the switch contact piece 11 lies in contact. The contact ring 24 is formed with a plurality of recesses 241, and is fixed to the shaft 21. Accordingly, when the micromotor 13 rotates, the shaft 21 is rotated in a manner to normally wind up the coiled spring 23.

At the other end of the switch 11 there is a protuberance serving as a contact, which turns "on" for a short time and "off" at the other time in dependence on the phasic relation between the protrusions 221 of the gear 22 and the recesses 241 of the contact ring 24. In the present embodiment, the switch contact piece turns "on" to revolve the micromotor 13 for about 0.5 second and turns "off" to stop it during the subsequent period of about 1 minute, and this operation is repeated.

A gear 25 is mounted on the shaft 21. The rotation of the gear 25 is subject to an accurate time adjusting action by virtue of the clock mechanism 26 which consists of a gear escapement wheel 261, an anchor 262 and a balance wheel 263. Simultaneously therewith, the clock mechanism 26 is normally endowed with power by the coiled spring 23. Accordingly, the on-off timing of the contact piece of the switch 11 becomes normally constant owing to the clock mechanism 26, and the various operations of this recording apparatus are executed at accurate time intervals.

On the other hand, the cam 19 revolved by the micromotor 13 through the gear 18 moves up and down a slide bar 32, which slides through an aperture in a fitting piece 31, and thus moves a dotting frame 33 up and down. Since the dotting frame 33 is drawn down by a pull spring 34, it is moved up and down and hits the tip 520 of a meter pointer 52 of the meter 51 so as to print a dot on pressure-sensitive recording paper 53 every revolution of the cam 19. In the present embodiment, the dot printing is executed once every two minutes.

FIG. 2(a) is a front view showing the profile of the cam 19. A hatched semicircle indicates a range of medium cam height. When the cam slide bar 32 lies in contact with this part, it raises the dotting frame 33 slightly. Accordingly, the meter pointer 52 is freely movable. When the cam 19 rotates in the direction of arrow to bring the cam slide bar 32 to the maximum cam height, the dotting frame 33 ascends to the highest position. When the cam 19 further rotates, the dotting frame 33 falls suddenly and hits the tip 520 of the meter pointer so as to print the dot. Upon further rotation of the cam 19, the cam height increases rapidly, and hence, the dotting frame 33 is immediately lifted to release the meter pointer 52. In the state illustrated in FIG. 2(a), the cam slide bar 32 is raised slightly.

On the other hand, the cam 20 moves an arm plate 43 one end of which is rotatably mounted on a shaft which, in turn, bears a miniature gear 41 and a ratchet 42. A pawl 44 is mounted on the arm plate 43 in a manner to be freely rotatable. Fixed near the tip of the pawl 44 is the lower end of the pull spring 34, the upper end of which is fixed to a protuberance 35 of the dotting frame 33. The pawl 44 is normally held in contact with the tooth surface of the ratchet 42, and it turns the ratchet 42 one tooth when the arm plate 43 is moved up and down by the rotation of the cam 20. Another pawl 45 lying in contact with the ratchet 42 is pressed against the tooth surface thereof by a pull spring 46, and it functions to prevent the ratchet 42 from reversing. The miniature gear 41 rotating simultaneously with the ratchet 42 revolves a gear 47 which is mounted on a feed drum for the recording paper. Consequently, the folding pressure-sensitive recording paper 53 is fed one tooth of the ratchet 42 every revolution of the cam 20 in a short time. That is, when the ratchet 42 turns one tooth, the gearing coupled therewith feeds the recording paper 53 instantly. In the present embodiment, the recording paper is fed ⅜ mm every 2 minutes.

FIG. 2(b) is a front view of the cam 20, and illustrates a state at the same time as in FIG. 2(a) on the left side. In the illustrated state, the arm plate 43 lies in contact with the cam just before the maximum cam height, and the pawl 44 is going to revolve the ratchet 42 one tooth. By mounting the cams 19 and 20 with a phase shift of appropriate angle as shown in FIGS. 2(a) and 2(b), the recording paper feed and the dot printing can be alternately executed.

In the present embodiment, the contact piece of the switch 11 is intermittently turned "on" and "off" so as to rotate the micromotor 13 for a short time of about 0.5 second per minute. Since the cams 19 and 20 are mounted on the rotary shaft which turns 180° in about 0.5 second with the rotation of the micromotor, both the cams rapidly turn 180° and then stop approximately 1 minute, this operation being repeated. In the state of FIG. 2(a) the cams are at rest after completion of the dot printing, while in the state of FIG. 2(b) they stand ready to feed the recording paper. Since both the cams rotate 180° in the direction of arrow in the following period of about 0.5 second, the cam 19 in FIG. 2(a) returns to the state in which the dotting frame is slightly raised in preparation for the dot printing, while the cam 20 in FIG. 2(b) returns to the state of standby after the recording paper has been instantly fed. In this way, the cams 19 and 20 intermittently rotate every 180° in 0.5 second, effect one revolution in two minutes, and complete one time of dot printing as well as one time of recording paper feed. That is, the dot printing and the recording paper feed are alternately conducted by the rotations of the two cams 19 and 20 the phases of which shift.

As previously referred to, this recording apparatus is provided with the power switching portion 50 for the measuring instrument to operate the meter 51. More specifically, a permanent magnet 55 is mounted on an end of the shaft 21, and a reed switch 56 is fixed to a position opposing to the permanent magnet in proximity thereto. This reed switch 56 turns "on" and "off" with the rotation of the shaft 21, and serves to turn the dry cell battery power supply of the measuring instrument operating the meter 51 "on" and "off." As a variation, such as shown in "FIG. 3," a common power supply may be provided for both the motor 13 and the instrument, and specifically the system adopts the recording apparatus of this invention in order to execute the self-recording of temperature measurements. It has a power source 12 employing U-1 dry cells of 4.5 volts, a temperature measuring instrument 70, and recording apparatus 60. The reed switch 56 which is disposed in opposition, and in proximity, to the permanent magnet 55 mounted on a constant-speed rotary shaft of the recording apparatus 60 is interposed between the power source 12 and the temperature measuring instrument 70. In this system, current supplied from the power source 12 is fed to the temperature measuring instrument 70 via the reed switch 56 and is also fed to a meter 51 after a voltage drop of 1.5 volt across a resistor 57. Accordingly, when the recording apparatus 60 is actuated, the permanent magnet 55 rotates and the reed switch 56 turns "on" and "off," so that the temperature measuring instrument 70 can be intermittently operated. Although the system of FIG. 3 operates the temperature measuring instrument 70 and the recording apparatus 60 by the use of the identical power source 12, it is preferable to operate the recording apparatus 60 according to FIG. 1 by separately using a dry cell of 1.5 volt, because the temperature measuring instrument 70 is less prone to pick up noises.

FIG. 4 shows an electric circuit diagram of the temperature measuring instrument 70. As previously stated, this circuit is intermittently operated by the reed switch 56. The current from the power source 12 is regulated by a constant-voltage circuit 71, and is applied to a bridge circuit 72. The bridge circuit 72 has a temperature sensor 73, and is connected to an IC amplifier 74 by the three-wire connection method. Also the IC amplifier 74 is periodically operated by the reed switch 56 so as to save the power consumption. The meter 51 serves to amplify and display a signal from the bridge circuit 72, and is installed on the recording apparatus 60.

FIG. 5 is a time chart which illustrates the mutual relations between the operations of the temperature measuring instrument 70 and the recording apparatus 60 in the present embodiment. A salience 61 indicates the point of time and the period of time of the operation of the temperature measuring instrument 70, a salience 62 the time of the dot printing, and a salience 63 the time of the recording paper feed. The temperature measuring instrument 70 in this embodiment repeats becoming operative about 20 seconds before the dot printing so as to get ready for a measurement and stopping the operation about 10 seconds later. The dotting of a measured value indicated by the salience 62 is instantly carried out once every two minutes. The recording paper feed indicated by the salience 63 is instantly carried out while the temperature measuring instrument 70 and the dotting mechanism are at rest.

As stated previously, the recording paper is fed ⅓ mm at intervals of 2 minutes, so that the feed speed is 10 mm/hr. In consequence, in case where recording paper having a total length of 22 m is used, measured values can be automatically recorded over a long term of about 3 months.

As evident from FIG. 5, the three operations are carried out in a short period of time and at good timing. Therefore, the dissipation of the battery is low, no great power is required at a time, and the recovery time of the battery suffices, so that the battery is of long life.

In the present recording apparatus, the dot printing and the recording paper feed are fully executed by the micromotor 13, and hence, no power is obtained from the clock mechanism 26. Accordingly, the clock mechanism continues to operate precisely, and the feed of the recording paper is precise even in case of recording over a long term.

Since the recording paper is of the folding type, the inspection and reception are facilitated, and the handling efficiency of the recording apparatus is enhanced. Owing to the pressure-sensitive recording paper, there does not occur the trouble as in the ink ribbon dotting type that dots become indistinct on account of the exhaustion of ink.

As described above, the recording apparatus of this invention can offer precise recording of measured values for a period of time without replenishing the power supply battery.

In the foregoing embodiment, the protuberance 35 of the dotting frame 33 and the pawl 44 mounted on the arm plate 43 are connected by the single pull spring 34, and the lowering of the dotting frame 33, the contact of the arm plate 43 with the cam 20 and the pressing of the pawl 44 against the ratchet 42 are carried out at the same time. However, even when by using e.g., two pull springs, the dotting frame 33 is connected to any desired fixing point under it and the pawl 44 is connected to any desired fixing point over it, the same function is achieved.

When, as the meter pointer 52 of the recording apparatus, one employing a synthetic resin wire at its tip is used, clear dots are obtainable. FIG. 6 shows a section of such meter pointer. The meter pointer 52 is formed of a fine tube having an inside diameter of 0.8 mm and made of, e.g., duralumin, and the tip portion 520 of the pointer is formed of a nylon wire having an outside diameter of 0.8 mm and is inserted and fixed in the fine tube of the meter pointer 52. The meter pointer 52 is attached to the meter 51, and its tip portion 52 is situated between the dotting frame 33 and the recording paper 53. Under the recording paper 53, there is a guide bar 54 for causing it to glide. The dotting frame 33 is lifted up by the slide bar 32 which moves up and down through the rotation of the cam 19. When the cam 19 rotates beyond the highest cam position, the dotting frame 33 rapidly falls by being drawn by the pull spring 34 disposed between it and the fixing point and hits the tip 520 of the pointer, whereupon it is raised in a moment. Since the recording paper 53 is fed at low speed, a series of dots as in FIG. 1 can be printed.

The nylon wire used for the pointer tip 520 is more elastic than the duralumin wire in the prior art, so that it is not deformed at all even when it hits a large number of times. Moreover, the specific gravity of nylon is about 1.2 and is approximately a half that of duralumin, so that the meter pointer moves better. It has been revealed principally by experimental results that, since the hardness of nylon is proper, the printed dots are clean and do not change in size even when the nylon wire hits a large number of times.

Although the use of the nylon wire has been exemplified here, similar results are obtained even with synthetic resin wires of polypropylene etc. whose physical characteristics resemble those of nylon. With such meter pointer, clear dots which do not change in size can be printed over a long term.

Since the recording apparatus adopts the recording paper of the folding type, it is facilitated to inspect a measured result in the course of measurement, and the handling efficiency is enhanced. Except the inspection of the measured result, however, quite the same operation is conducted and quite equivalent effects are achieved even in case of employing rolled recording paper.

Although the above embodiment has been explained by taking the temperature measuring instrument as an example, the recording apparatus is applicable to various measurements by selecting a sensor and employing an electric circuit of a measuring instrument suitable thereto.

What is claimed is:

1. In dot type recording apparatus which has a power source, and dotting means and recording paper feed means, both being operated by said power source, and in which recording is executed by said dotting means causing a pointer of a meter operated by a measuring instrument to hit the recording paper, the improvement in such recording apparatus comprising:

said dotting means and recording paper feed means having, a motor driving at least two cams and being driven by said power source, and a clock mechanism operated by rotation of said motor;

an electrical switch in circuit between said power source and said instrument and having "on" and "off" periods of time determined by said clock mechanism;

said dotting means pressing the pointer of the meter against the recording paper for a fixed dotting period of time by means of one of said cams rotated by said motor;

said paper feed means intermittently feeding recording paper a fixed length in a short fixed feeding period of time other than the dotting period of time of said dotting means by means of another of said cams being rotated by said motor; and means for operating said instrument and said meter only during a fixed period of time greater than and including said dotting period of time as determined by said "on" and "off" periods of time of said switch, in interlocking relationship with said dotting means, and thus operating said measuring instrument intermittently.

2. Recording apparatus according to claim 1, wherein said power source is a battery, said "on" period of time corresponds to said instrument operating fixed period of time, said feeding period of time falls entirely within said "off" period of time and is a minor portion thereof, and said "on" period of time being substantially smaller than said "off" period of time.

3. Recording apparatus according to claim 1, wherein said recording paper is folded so as to be fed from a folded storage supply to a folded recorded storage.

4. Recording apparatus according to claim 1, wherein the dotting means comprises a cam slide bar that ascends and descends in contact with a cam face of said another cam, and a dotting frame moved up and down by the ascent and descent of said cam slide bar, said dotting frame hitting the pointer of the meter operated by the measuring instrument every fixed dotting period of time as determined by the rotation of said motor and its driven cams, to print a dot on said recording paper.

5. Recording apparatus according to claim 4, wherein the means for feeding the recording paper comprises a ratchet which is coupled to a gear mounted on a drum for feeding said recording paper, an arm plate one end of which is rotatably mounted on a shaft of said ratchet, a cam which lies in contact with the other end of said arm plate and which is rotated by said motor, a pawl which is rotatably supported by a pin provided on said arm plate and whose fore end lies in contact with a tooth surface of said ratchet, a spring which is mounted on an intermediate position between the fore end of said pawl and said pin and which presses said pawl against the tooth surface of said ratchet, and a spring which is mounted on the dotting frame and which presses said dotting frame against a cam slide bar, said recording paper being fed in a short time at fixed time intervals by the rotation of said motor.

6. Recording apparatus according to claim 5, wherein an intermediate part of said pawl and said dotting frame are coupled by a pull spring.

7. Recording apparatus according to claim 5, wherein said switch means for turning "on" and "off" comprises a permanent magnet mounted on a constant-speed rotary shaft of said clock mechanism and a reed switch placed in proximity to said permanent magnet, said reed switch connected between said power source and said measuring instrument which is constructed of a constant current circuit as well as an amplifier, a measuring circuit having a sensor supplied with current from said constant current circuit and which indicating an electrical quantity by a meter of the recording apparatus, said reed switch being intermittently connected by rotation of said permanent magnet.

8. Recording apparatus according to claim 7, wherein the power source of said measuring instrument and that of said recording apparatus are separate.

9. Recording apparatus according to claim 7, wherein a tip portion of the meter pointer being hit against the recording paper so as to record the measured value, is made a synthetic resin wire.

10. Recording apparatus according to claim 9, wherein said synthetic resin wire is made a nylon wire.

11. A portable recording apparatus, comprising:
a portable source of stored electrical energy;
an electric drive motor in circuit with said source;
a mechanical clock mechanism having a mechanical source of stored mechanical energy for driving said clock mechanism and being drivenly connected to said electric motor for increasing its stored mechanical energy with operation of said electric motor;
switch means operated by said clock mechanism in circuit with said electric motor and power source for providing a repeat pattern of a fixed period of time for operation of said electric motor and a fixed larger period of time when said electric motor is not operated;
a meter having a movable pointer;

a measuring instrument for operating the meter to move the pointer in correlation with the change in a value to be measured and recorded, and said pointer having means for marking recording paper;

means for feeding recording paper past said pointer and including mechanical means driven by operation of said electric motor independently of said clock mechanism for feeding the recording paper only during a fixed feeding period of time that is within and substantially shorter than the operating period of time of said electric motor; and mechanical means for driving said pointer onto said recording paper for recording only during a fixed recording period within and substantially shorter than said motor operating period, and with said recording period being spaced from said feeding period, and said pointer driving means being driven by said motor independently of said clock mechanism.

12. Recording apparatus according to claim 11, wherein said source is a dry cell battery.

13. Recording apparatus according to claim 11, wherein said measuring instrument is electrically operated; and including switch means operated by said clock mechanism for providing electrical energy to said measuring instrument only during a fixed period of time including and larger than said recording period of time.

14. Recording apparatus according to claim 13, wherein said source is a dry cell battery.

* * * * *